Figure 1:
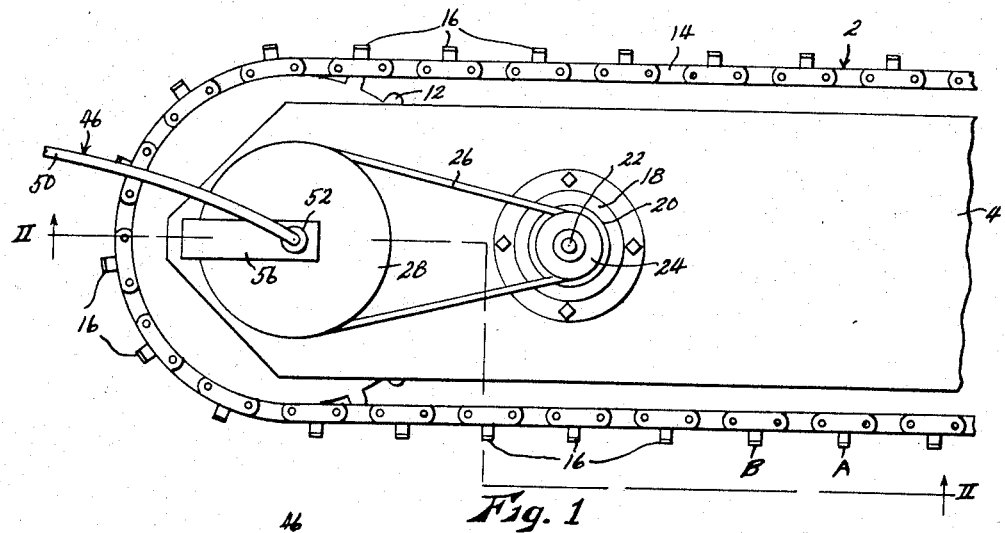

March 19, 1968  R. D. GUTTING  3,373,624
REMOTE CONTROL APPARATUS

Filed Dec. 23, 1966  2 Sheets-Sheet 1

INVENTOR.
Robert D. Gutting
BY PENDLETON, NEUMAN
SEIBOLD & WILLIAMS
Attorney.

March 19, 1968    R. D. GUTTING    3,373,624
REMOTE CONTROL APPARATUS
Filed Dec. 23, 1966    2 Sheets-Sheet 2

INVENTOR.
Robert D. Gutting
BY PENDLETON, NEUMAN
SEIBOLD & WILLIAMS
Attorney.

United States Patent Office 3,373,624
Patented Mar. 19, 1968

3,373,624
REMOTE CONTROL APPARATUS
Robert D. Gutting, Topeka, Kans., assignor to The Home-O-Nize Co., Muscatine, Iowa, a corporation of Iowa
Filed Dec. 23, 1966, Ser. No. 604,468
10 Claims. (Cl. 74—388)

This invention relates to new and useful improvements in remote control apparatus, and is an improvement over the device shown in my co-pending application Ser. No. 604,423, filed Dec. 23, 1966.

The invention relates generally to devices of a type adapted to initiate operation of a power-driven apparatus from a remote control station, and to terminate operation of said apparatus automatically after it has performed some desired function depending on the period of operation thereof. A purely exemplary use of the device is in connection with conveyors, whereby any one of a large number of objects supported along said conveyor may be moved automatically to some key station on the conveyor for access to or usage of said object. My above identified co-pending application showed the use of an endless conveyor having means for supporting a large number of objects therealong, and a remote control device operable to move said conveyor in one direction only until any one of said objects was positioned at the key station. A practical difficulty of this arrangement was that if the desired object was closely adjacent the key station, but spaced therefrom in the direction of conveyor movement, said object would necessarily travel nearly the entire length of the conveyor to reach the key station when operation of said conveyor was initiated by the remote control device. This resulted in objectionable delays and loss of time.

Accordingly, the principal object of the present invention is the provision of a remote control apparatus of the character described operable to initiate operation of the conveyor in either direction, and which is so arranged that when actuated, it will automatically select the direction of movement providing for the shortest and most direct travel of the selected object to the key station.

Other objects are simplicity and economy of construction, efficiency and dependability of operation, and adaptability with minor adaption to control and regulate any apparatus driven by a rotating shaft regardless of the type of prime mover used to drive said shaft. Apparatus including an operating shaft driven by an electric motor has been selected to illustrate the principles of the invention, but the invention is not thus limited.

With these objects in view, as well as other objects which will appear in the course of the specification, reference will be had to the accompanying drawing, wherein:

FIG. 1 is a fragmentary top plan view of a conveyor system adapted for control by a remote control apparatus embodying the present invention.

Figure 2:
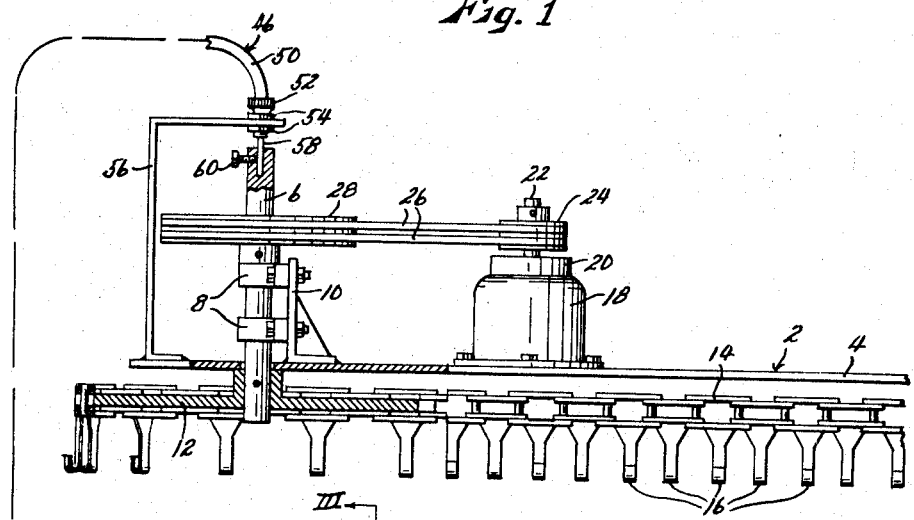
Figure 2:
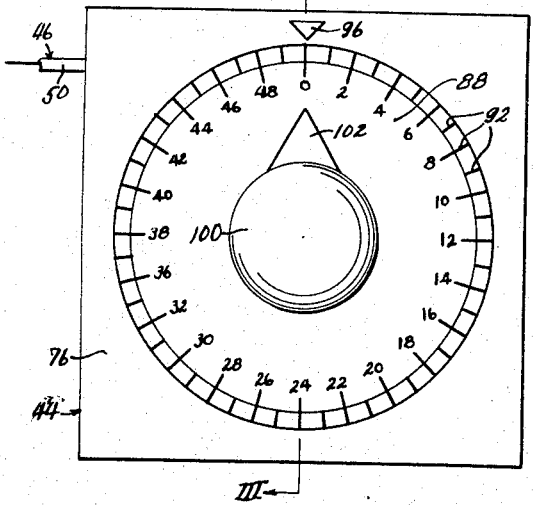
Figure 3:
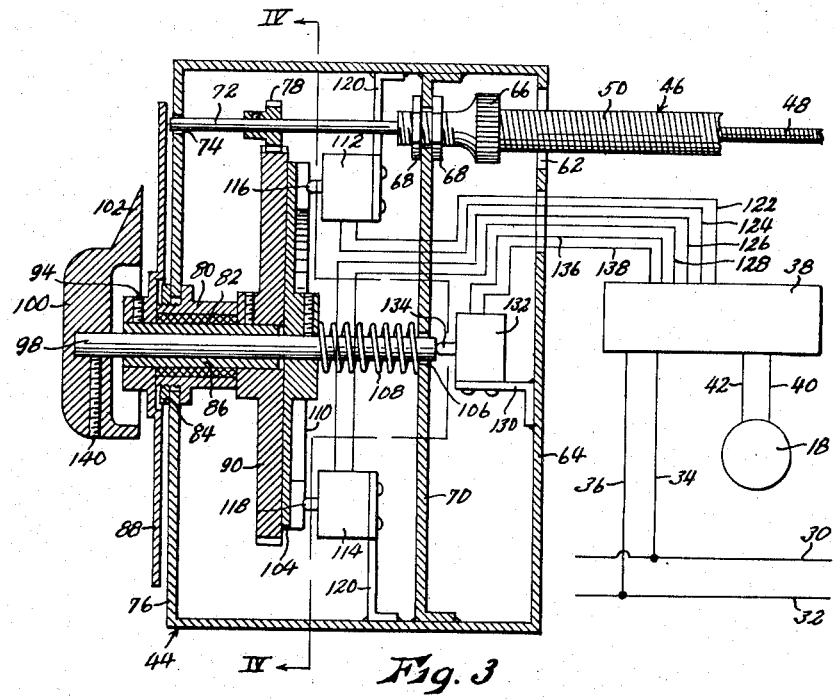
Figure 4:
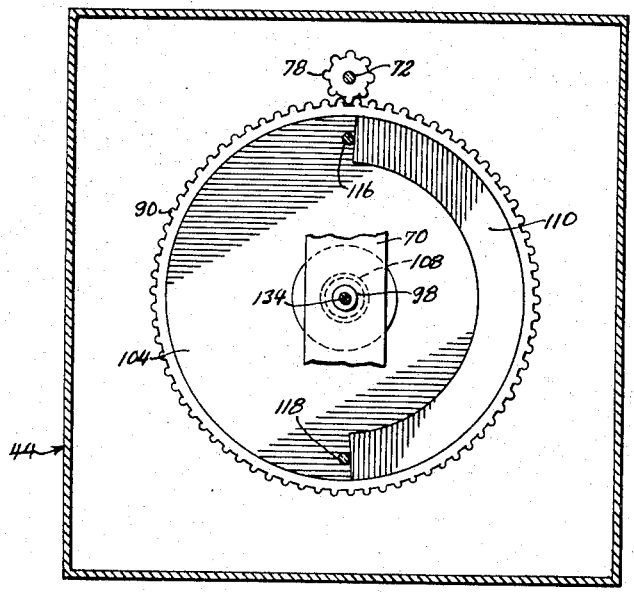

FIG. 2 is a somewhat irregular sectional view taken on line II—II of FIG. 1, with parts left in elevation and partially broken away, including a front elevational view of the control apparatus cabinet, FIG. 3 is an enlarged sectional view taken on line III—III of FIG. 2, with parts left in elevation, and includes a schematic wiring diagram of the apparatus, and FIG. 4 is a sectional view taken on line IV—IV of FIG. 3.

Like reference numerals apply to similar parts throughout the several views, and the numeral 2 applies generally to a conveyor system shown fragmentarily in FIGS. 1 and 2. Said conveyor system includes an elongated, horizontally disposed base plate 4 which is rigidly supported by any suitable means, not shown. Adjacent one end of said base plate, a vertical shaft 6 is supported rotatably in bearings 8 carried by a bracket 10 affixed to said base plate, and a large toothed sprocket wheel 12 is affixed to the lower end of said shaft. An endless sprocket chain 14 is trained about said sprocket wheel and extends along said base plate. It will be understood that the opposite end of the chain loop, not shown, is trained about a sprocket wheel similar to wheel 12, carried at the opposite end of the base plate. Mounted on the chain, at regularly spaced intervals along the entire length thereof, are a series of hooks 16, from which objects may be suspended. Let it be assumed that the hook further designated by the letter A in FIG. 1 is at the "key station" to which any one of the hooks may be moved and positioned by the remote control apparatus to be described below. It will be understood that various structural details of the conveyor system, such as roller supports for chain 14 intermediate the sprocket wheels, are not pertinent to the present invention and are not here shown.

The conveyor is driven by an electric motor 18 mounted on base plate 4, said motor acting through a speed reducer 20 to drive a shaft 22 on which is fixed a pulley 24. Said pulley is operably connected by belts 26 to a pulley 28 fixed on sprocket shaft 6. Motor 18 is powered from electric line wires 30 and 32 (see FIG. 3) through wires 34 and 36, a motor control unit 38, and wires 40 and 42. It will be understood that motor 18 is reversible, and that control unit 38 contains switching means whereby said motor may be started, stopped and reversed. The details of such control units are, however, well known in the art and are therefore not here shown. The control unit is actuated by the remote control apparatus to be described, which may be carried in a cabinet or frame 44 disposed in any desired position remote from the conveyor.

Conveyor sprocket shaft 6 is connected to cabinet 44 by a flexible drive member 46. Although such drive members are standard and well known, as shown it comprises essentially a flexible cable 48 (see FIG. 3) capable of transmitting rotational motion from one end thereof to the other even though it may be curved or looped, enclosed in a flexible sheath 50. At the conveyor end of the drive member, said sheath is secured to an end fitting 52 which is fixed by lock nuts 54 in a bracket 56 fixed to base plate 4. Carried rotatably in fitting 52 is a shaft 58 affixed to cable 48 and extending outwardly from said fitting. Said shaft is coaxial with sprocket shaft 6, engaging in a socket formed in the end of said sprocket shaft and being secured non-rotatably therein by set screw 60.

Control cabinet 44 is shown as formed of sheet metal as a rectilinear box although this is of course optional. Flexible drive member 46 enters said box through a hole 62 formed in the rear wall 64 of the cabinet. Within the cabinet, sheath 50 of the drive member is attached to an end fitting 66 secured by lock nuts 68 to a bracket 70 fixed in said cabinet. Cable 48 is affixed to a shaft 72 rotatably mounted in end fitting 66 and extending horizontally forwardly therefrom, the forward end of said shaft being retained rotatably in a hole 74 formed therefor in front wall 76 of the cabinet. A gear pinion 78 is fixed on said shaft intermediate said front wall and end fitting 66.

A bearing sleeve 80 having a bronze bushing 82 extends centrally and horizontally through front cabinet wall 76, being secured therein by lock unit 84. A tubular shaft 86 is carried rotatably in said bushing. To the outer end of said shaft, externally of the cabinet, is affixed a planar circular dial 88, and to the inner end of said shaft, within the cabinet, is affixed a gear wheel 90 which is meshed with pinion 78. Thus whenever motor 18 is operating, sprocket shaft 6 operates through flexible drive 48 and pinion 78 to rotate gear wheel 90 and dial 88 simultaneously. Preferably the ratio of pinion 78 to gear 90 is the same as the ratio of the circumference of sprocket 12 to the length of chain 14, so that dial 88 completes one revolution for each complete cycle of travel of chain 14. As shown in FIG. 2, the face of dial 88 may have an indicia mark 92 imprinted thereon corresponding to each hook 16 of the chain, and the hooks and dial marks may be correspondingly numbered. By loosening the set screw 94 securing dial 88 to shaft 86, the indicia mark 92 corresponding to the hook 16 then at station A may be aligned with an index mark 96 imprinted on cabinet wall 76 adjacent the dial. Thereafter, said index mark will always indicate on the dial the number of the hook 16 which is disposed at station A. Carried rotatably and slidably in tubular shaft 86 is a solid shaft 98. Affixed to the outer end of shaft 98, adjacent the outer face of dial 88, is a knob 100 having a radial pointer 102 which by rotating the knob may be moved relative to the calibrations of dial 88. Within the cabinet, a friction disc 104 is affixed to shaft 98. The forward face of said friction disc is planar and normally engages the planar rearward face of gear wheel 90. Shaft 98 extends rearwardly from the friction disc, the extreme rearward end thereof being supported rotatably and slidably in a hole 106 provided therefor in bracket 70. A compression spring 108 is disposed about said shaft between the bracket and the friction disc, urging said friction disc forwardly against gear wheel 90 whereby the former is normally rotated by the latter. However, a manual inward pressure on knob 100 will move shaft 98 inwardly against spring 108, separating friction disc 104 from gear wheel 90 to permit independent rotation thereof. The rearward face of friction disc 104 is not planar, but has a portion of the peripheral edge thereof thickened to form an "elevated" track 110, said track being of slightly less than 180 degrees in angular extent, as shown in FIG. 4.

Mounted in cabinet 44 behind friction disc 104 are a pair of micro-switches 112 and 114 having operating buttons 116 and 118 respectively, each switch being supported by a bracket 120 fixed in the cabinet. Said operating buttons extend forwardly adjacent the rearward face of friction disc 104, and are disposed 180 degrees apart with respect to shaft 98, being spaced apart from said shaft at a distance to be engaged by track 110 of the friction disc. They are engaged and pressed rearwardly by the added thickness of track 110 whenever the friction disc is turned to bring said track thereunder, and are released whenever said track is moved out of alignment therewith. Switch 112 is connected to motor control unit 38 by wires 122 and 124, and switch 114 is connected to said motor control unit by wires 126 and 128. While the details of the motor control unit are standard and not shown, as mentioned above, they are such that motor 18 is off when neither of operating buttons 116 or 118 is depressed, that motor 18 is operated to cause rotation of friction disc 104 in a clockwise direction, as viewed in FIG. 4, when button 116 is depressed, and that motor 18 is operated to cause rotation of friction disc 104 in a counter-clockwise direction, as viewed in FIG. 4, when button 118 is depressed. Also as shown in FIG. 4, the angular extent of track 110 of the friction disc is such, just less than 180 degrees, that both of buttons 116 and 118 may be released at the same time, with the ends of the track disposed immediately adjacent the buttons, so that motor 18 will not be actuated. However, if the friction disc is turned in either direction, track 110 will depress one or the other, but not both, of buttons 116 and 118.

Mounted in cabinet 44 by means of a bracket 130 is a third micro-switch 132 having an operating button 134 disposed directly behind the rearward end of shaft 98, said switch being connected to motor control unit 38 by wires 136 and 138. It will be understood that so long as friction disc 104 is held against gear wheel 90 by spring 108, button 134 is not depressed and the motor is controlled by switches 112 and 114 as previously described. However, whenever shaft 98 is moved rearwardly against spring 108, by pressing knob 100 inwardly, shaft 98 depresses button 134. It will be understood that this shuts motor 18 off regardless of the positions of switches 112 and 114.

The device is readied for use by adjusting dial 88 on shaft 86, as previously described, so that the number of the hook 16 at station A is indicated on dial 88 by index mark 96, and then adjusting knob 100 on shaft 98, as by loosening set screw 140 securing said knob to said shaft, until pointer 102 of the knob is aligned with index mark 96 while friction disc 104 is in the index position shown in FIG. 4. The apparatus is then ready for use.

To bring any desired hook 16 to station A, the operator presses inwardly on knob 100, rotates it to move pointer 102 into alignment with the numbered calibration 92 of dial 88 corresponding to the number of the desired hook, and releases the knob. Pressing knob 100 inwardly separates friction disc 104 from gear wheel 90, so that the knob can be turned freely, and also actuates switch 132 so that motor 18 cannot operate until the knob is again released. Turning knob 100 of course also turns friction disc 104, causing track 110 thereof to depress either button 116 or button 118, depending on which direction the knob is turned. Then, when the knob is released so that switch 132 permits operation of the motor, either switch 112 or 114 will actuate the motor to drive the conveyor chain 14 until the desired hook 16 is at station A, at which time track 110 will disengage both of switches 112 and 114 to shut the motor off.

Moreover, the desired hook 16 will travel to station A by the shortest route, for greater speed and efficiency. For example, the hook 16 further designated by the letter B in FIG. 1 will never be carried to station A by clockwise movement of chain 14, requiring nearly a full revolution of the chain, but will move directly from B to A, so that the chain need move only the distance between two hooks. This advantage results from the selective operation of switches 112 and 114. In FIG. 2, if pointer 102 is turned to select any of calibrations 0-24, switch 116 will cause rotation of dial 88 in a counter-clockwise direction. Since any of these calibrations is more quickly brought to index mark 96 by counter-clockwise rotation than by clockwise rotation, and since the calibration and mark 96 bear the same relation as the hook corresponding to the calibration bears to station A of the conveyor, the selected hook always moves to station A by the shorter route. The operation is of course reversed if pointer 102 is turned to any calibration 92 in the left half of the dial (calibration 24-50 as shown in FIG. 2).

The advantages of this feature of my invention are particularly valuable with conveyors or other controlled apparatus having a slow movement. The time lost by a one-way operation of the conveyor may be quite considerable in such a slow-motion or long-period apparatus.

Cut-off switch 132 may not be necessary in all installations. However, without it the motor would begin to operate, and hence dial 88 would begin to rotate, as soon as knob 100 was turned, during the time the operator is attempting to set pointer 102 at a particular calibration of the dial. If the dial moves slowly, this may present no great difficulty, but may be extremely difficult to accomplish accurately if the dial rotates rapidly. The cut-off switch permits full and careful setting of the pointer before the dial starts to rotate.

Finally, although I have shown and described an electrical system, my invention is not actually restricted to this type of operation. For example, motor 18 could be a hydraulic motor rather than electric, in which case switches 112, 114 and 132 could be pilot valves in the hydraulic system of the motor, or could control such pilot valves. Also, a constantly operating gasoline engine could be substituted for motor 18, with clutches for completing a reversible drive connection to shaft 6. In this case, switches 112, 114, and 132 could be mechanical means for controlling said clutches, or could control electrically operated means for controlling the clutches. Nor, of course, is the apparatus limited to the control of conveyor systems, but is adapted broadly speaking to control and index the position of any apparatus driven by a rotating drive shaft, and having a prime mover for turning said drive shaft.

It is considered that all of the above adaptations, as well as numerous other minor changes of structure and operation, could be made without departing from the spirit of the invention as defined by the scope of the appended claims.

What I claim as new and desire to protect by Letters Patent is:

1. In combination with a power-operated device having a rotatable drive shaft and having a reversible prime mover operable to turn said drive shaft, a remote control apparatus comprising:
  (a) a frame,
  (b) a first member carried rotatably in said frame,
  (c) means interconnecting said drive shaft with said first member whereby the latter is rotated in timed synchronization with the former,
  (d) a second member carried rotatably in said frame,
  (e) means interconnecting said first and second members whereby the latter is normally rotated by the former, but which is manually disengageable to permit independent manual rotation of said second member,
  (f) a pair of actuating devices carried by said frame and interconnected to said prime mover, said actuating devices functioning when operated to cause operation of said prime mover in respectively opposite directions, and
  (g) operating means carried by said second member and operable as said second member is rotated to engage and operate said actuating devices selectively, said second member having a single angular index position in which its operating means do not engage either of said actuating devices and said prime mover is therefore not actuated, said operating means engaging and operating one of said actuating devices whenever said second member is positioned between said index position and a cross-over point angularly spaced from said index point, and engaging and operating the other of said actuating devices when said second member is positioned in the remainder of the full circle of revolution of said second member, said actuating devices being operable to cause operation of said prime mover, and hence rotation of said second member, in a direction to return said second member to its index position by rotation thereof in respectively opposite directions.

2. A remote control apparatus as recited in claim 1 wherein said cross-over point in the rotation of said second member is spaced angularly 180 degrees from the index position thereof, whereby said second member is returned to its index position by the shortest possible angular movement.

3. A remote control apparatus as recited in claim 1 with the addition of:
  (a) a third actuating device carried by said frame and operable by said means interconnecting said first and second members to deactivate said prime mover whenever said second member is disengaged from said first member, regardless of the condition of operation of said first pair of actuating devices.

4. A remote control apparatus as recited in claim 3 wherein said prime mover constitutes a reversible electric motor, and wherein said actuating devices constitute electric switches disposed in the control circuit of said motor.

5. A remote control apparatus as recited in claim 1 wherein said prime mover constitutes a reversible electric motor, and wherein said actuating devices constitute electric switches disposed in the control circuit of said motor.

6. A remote control apparatus as recited in claim 1 wherein said frame constitutes a closed cabinet and wherein said first member is disposed in said cabinet and is fixed on a shaft rotatably mounted in said cabinet and extending externally thereof, and with the addition of:
  (a) a dial fixed on said shaft externally of said cabinet whereby to rotate with said first member, said dial being calibrated according to a function of the device being controlled, and readable in conjunction with a fixed index mark on said cabinet to indicate the condition of the controlled device relative to the calibrated function.

7. A remote control apparatus as recited in claim 6 wherein said second member is fixed on a second shaft within said cabinet, said second shaft being carried rotatably by said cabinet coaxially with said first named shaft and extending externally of said cabinet, and with the addition of:
  (a) a pointer affixed to the extended end of said second shaft and being rotatable therewith, whereby said pointer may be turned to any desired position relative to said calibrated dial whenever the means normally interconnecting said first and second members is disconnected.

8. A remote control apparatus adapted for controlling the positioning of a device having a reversible prime mover comprising:
  (a) a first rotatable member,
  (b) means for driving said first member in timed synchronization with a device to be controlled,
  (c) a second rotatable member,
  (d) means interconnecting said first and second rotatable members whereby the latter is normally rotated by the former and which permits independent manual rotation of said second member,
  (e) a pair of actuating devices each having an operative state and adapted to effect operation of such prime mover in respectively opposite direction when in such operative states, and each having a nonoperative state,
  (f) operating means carried by said second member and operable as said second member is rotated to operate said actuating devices selectively, said second member having a single angular index position in which both of said actuating devices are in said nonoperative state, said operating means engaging and operating one of said actuating devices to its operative state whenever said second member is positioned between said index position and a cross-over point angularly spaced from said index point, and engaging and operating the other of said actuating devices to its operative state when said second member is positioned in the remainder of the full circle of revolution of said second member.

9. A remote control apparatus as in claim 8 wherein each of said actuating devices is an electric switch.

10. A remote control apparatus as in claim 9 wherein said operating means is a cam, said switches being normally open and each including an operating element disposed in the path of said cam whereby said cam closes said switches selectively.

References Cited

UNITED STATES PATENTS

| | | | |
|---|---|---|---|
| 2,223,207 | 11/1940 | Ellis | 318—466 |
| 2,352,156 | 6/1944 | Anderson | 318—466 |
| 2,459,876 | 1/1949 | Gibson | 318—466 |
| 2,656,027 | 10/1953 | Crookston | 192—138 |
| 2,915,120 | 12/1959 | Smith | 318—466 |

DONLEY J. STOCKING, *Primary Examiner.*

LEONARD H. GERIN, *Examiner.*